(12) United States Patent
Dan et al.

(10) Patent No.: US 11,494,009 B2
(45) Date of Patent: Nov. 8, 2022

(54) TOUCH SCREEN SENSOR AND TOUCH SCREEN PANEL HAVING SAME

(71) Applicant: AMOSENSE CO., LTD., Cheonan-si (KR)

(72) Inventors: Sung-Baek Dan, Gyeonggi-do (KR); Byoung-Su Jin, Gyeonggi-do (KR)

(73) Assignee: AMOSENSE CO., LTD., Chungcheongnam-do (KR)

(*) Notice: Subject to any disclaimer, the term of this patent is extended or adjusted under 35 U.S.C. 154(b) by 388 days.

(21) Appl. No.: 16/603,192

(22) PCT Filed: Apr. 3, 2018

(86) PCT No.: PCT/KR2018/003915
§ 371 (c)(1),
(2) Date: Oct. 4, 2019

(87) PCT Pub. No.: WO2018/190554
PCT Pub. Date: Oct. 18, 2018

(65) Prior Publication Data
US 2021/0132714 A1 May 6, 2021

(30) Foreign Application Priority Data
Apr. 11, 2017 (KR) .................. 10-2017-0046908

(51) Int. Cl.
*G06F 3/041* (2006.01)
*H01Q 1/22* (2006.01)
*H01Q 1/40* (2006.01)

(52) U.S. Cl.
CPC ........... *G06F 3/041* (2013.01); *H01Q 1/2291* (2013.01); *H01Q 1/40* (2013.01)

(58) Field of Classification Search
CPC combination set(s) only.
See application file for complete search history.

(56) References Cited

U.S. PATENT DOCUMENTS

| | | | |
|---|---|---|---|
| 2012/0098782 A1 | 4/2012 | Nam | |
| 2016/0328057 A1* | 11/2016 | Chai | G06F 3/0412 |
| 2018/0314369 A1* | 11/2018 | Yashiro | H01Q 1/243 |

FOREIGN PATENT DOCUMENTS

| | | |
|---|---|---|
| KR | 2012-0036658 | 4/2012 |
| KR | 10-2012-0043499 | 5/2012 |
| KR | 10-2013-0070247 | 6/2013 |

(Continued)

*Primary Examiner* — Deeprose Subedi
(74) *Attorney, Agent, or Firm* — Wells St. John P.S.

(57) ABSTRACT

Disclosed are a touch screen sensor and a touch screen panel having the same, wherein an antenna electrode is formed in a dummy region between touch sensing electrodes, thereby preventing visibility degradation of the touch screen panel and performing touch sensing and an antenna function. The touch screen sensor includes: a base member made of a transparent material; an upper circuit pattern composed of multiple first sensing electrodes spaced apart from each other and formed on a first surface of the base member; a lower circuit pattern composed of multiple second sensing electrodes spaced apart from each other and formed on a second surface of the base member; and an antenna electrode formed on the first surface of the base member and formed in a dummy space defined between the multiple first sensing electrodes.

4 Claims, 8 Drawing Sheets

(56) References Cited

FOREIGN PATENT DOCUMENTS

| KR | 10-1481996 | 1/2015 |
| KR | 10-2015-0115486 | 10/2015 |
| KR | 10-2016-0086697 | 7/2016 |
| KR | 10-2016-0094575 | 8/2016 |
| TW | 2016-43658 | 12/2016 |
| WO | WO2016-102975 | 6/2016 |

* cited by examiner

TOUCH SCREEN SENSOR AND TOUCH SCREEN PANEL HAVING SAME

CROSS REFERENCE TO RELATED APPLICATION

This is a 35 U.S.C. § 371 application of, and claims priority to, International Application No. PCT/KR2018/003915, which was filed on Apr. 3, 2018, and claims priority to Korean Patent Application No. 10-2017-0046908, filed on Apr. 11, 2017, the teachings of which are incorporated herein by reference.

TECHNICAL FIELD

The present invention relates generally to a touch screen sensor and a touch screen panel having the same. More particularly, the present invention relates to a touch screen sensor and a touch screen panel having the same, wherein the touch screen sensor for the touch screen panel is mounted in an electronic device in which a display is built, and senses a touch.

BACKGROUND ART

Recently, as a home network technology has emerged in telecommunications and electronics industry, various electronic devices have been released. In a home network, electronic devices located within a particular domain unit such as a home or a building are connected over a network, and a network is constructed between the electronic devices.

In such an electronic device, a touch screen panel may be mounted to enhance user convenience. In general, a touch screen panel is manufactured in such a manner that a touch sensor having a transparent electrode formed by coating a surface of a transparent film with an electrode material is bonded to cover glass.

Figure 1:
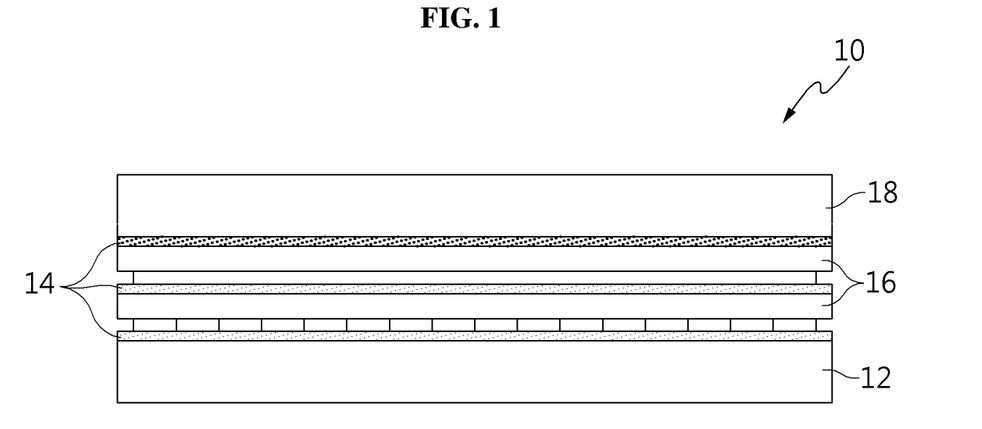
FIG. 1 is a diagram illustrating a touch screen panel in the related art.
Figure 2:
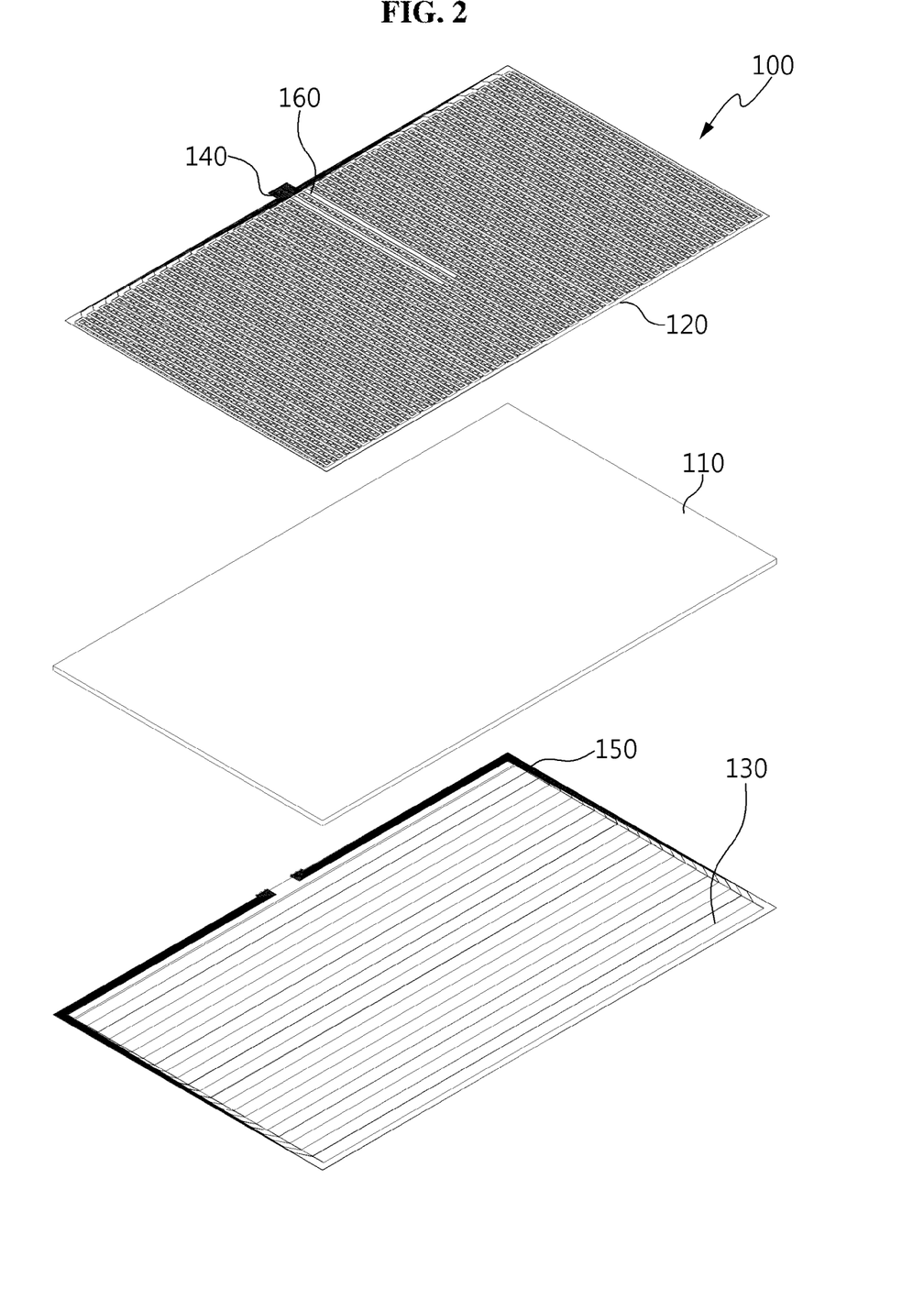
FIGS. 2 to 6 are diagrams illustrating a touch screen sensor according to an embodiment of the present invention.
Figure 3:
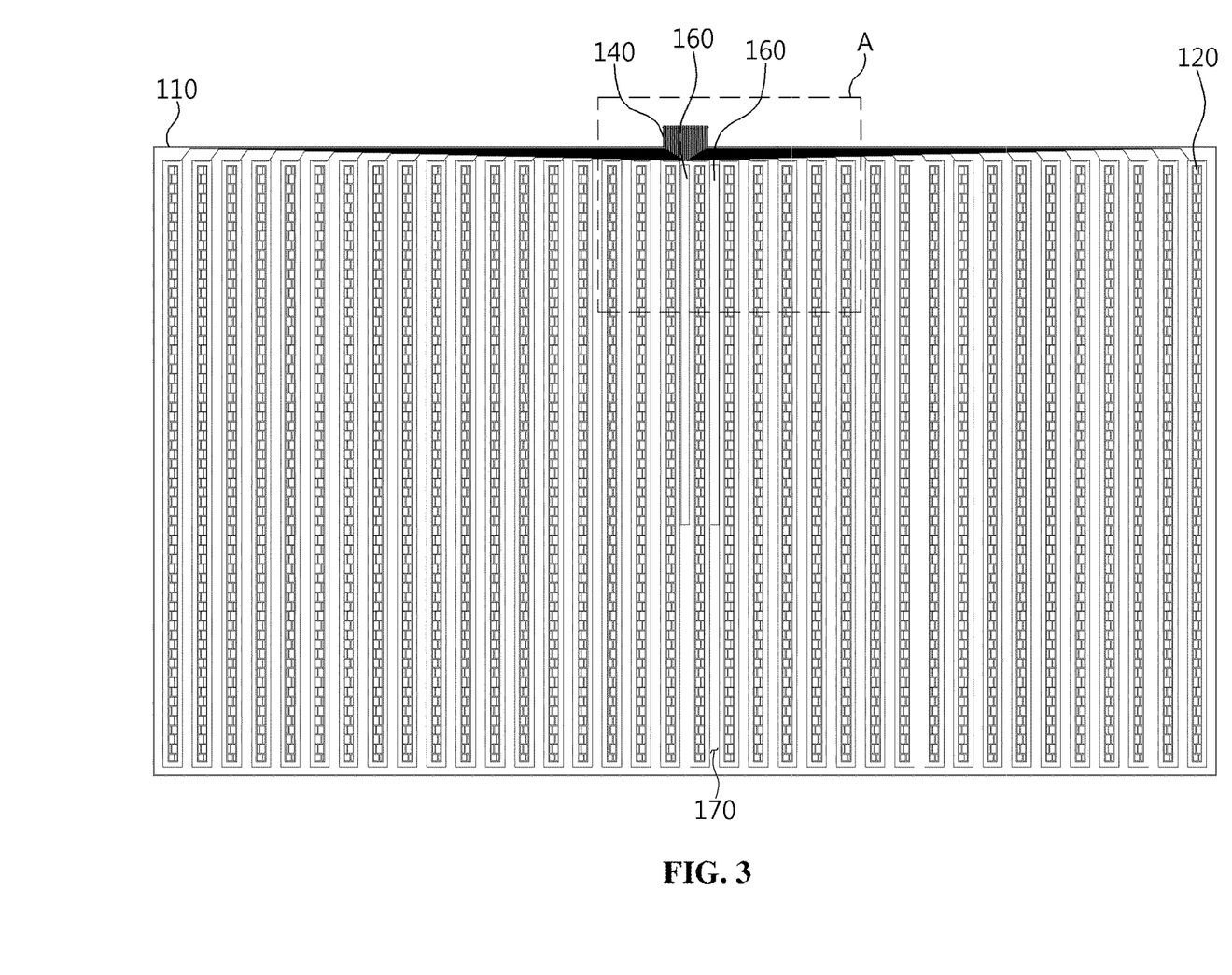
Figure 4:
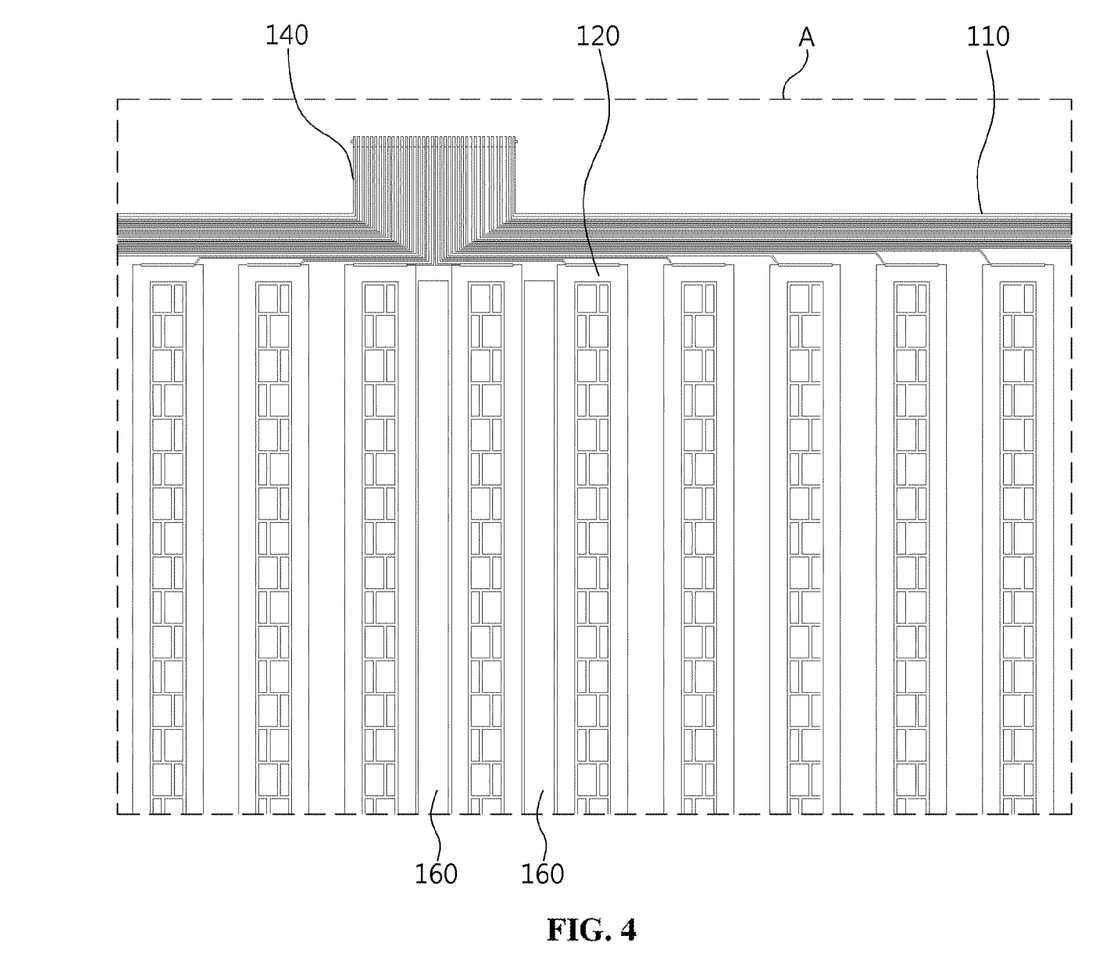
Figure 5:
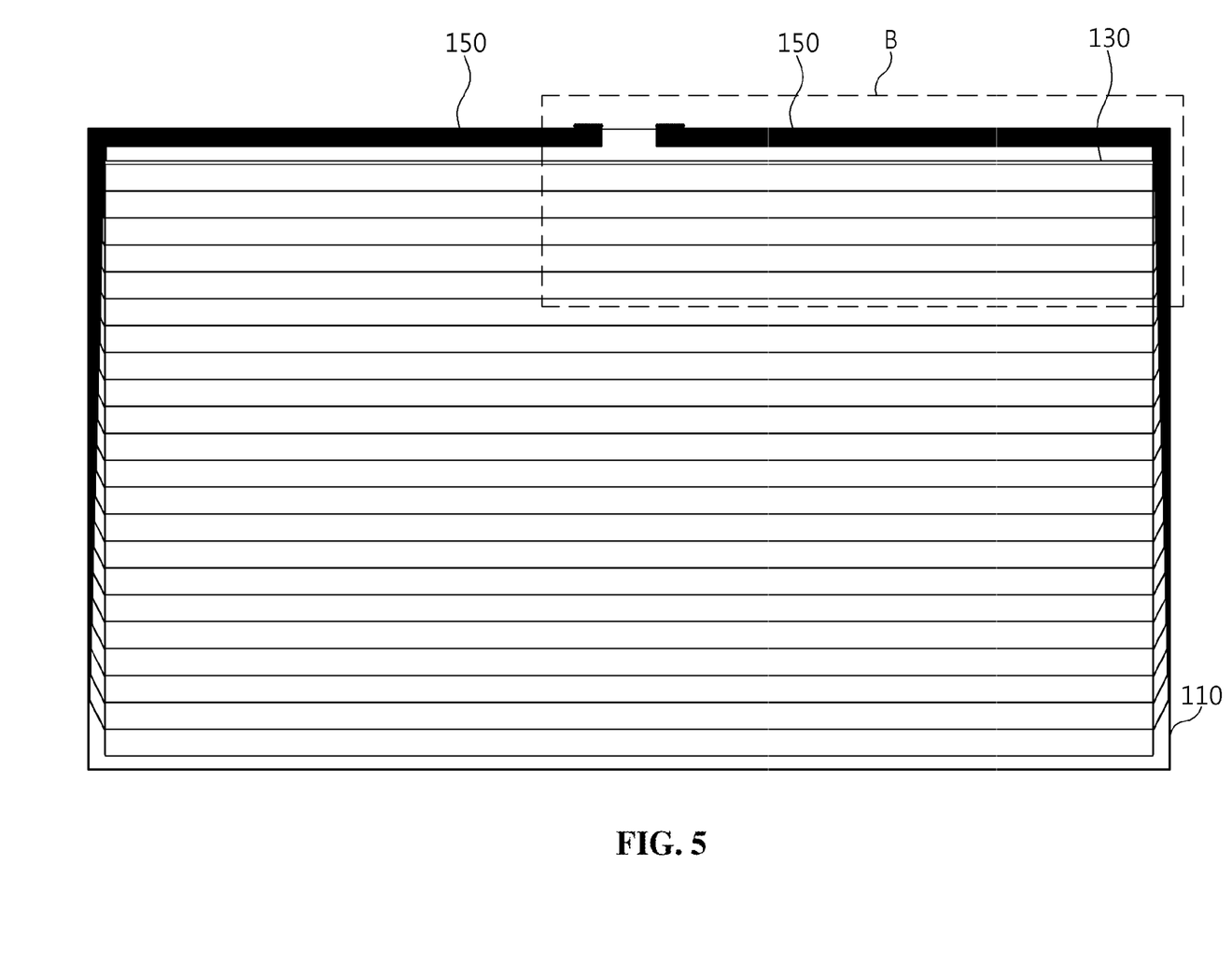
Figure 6:
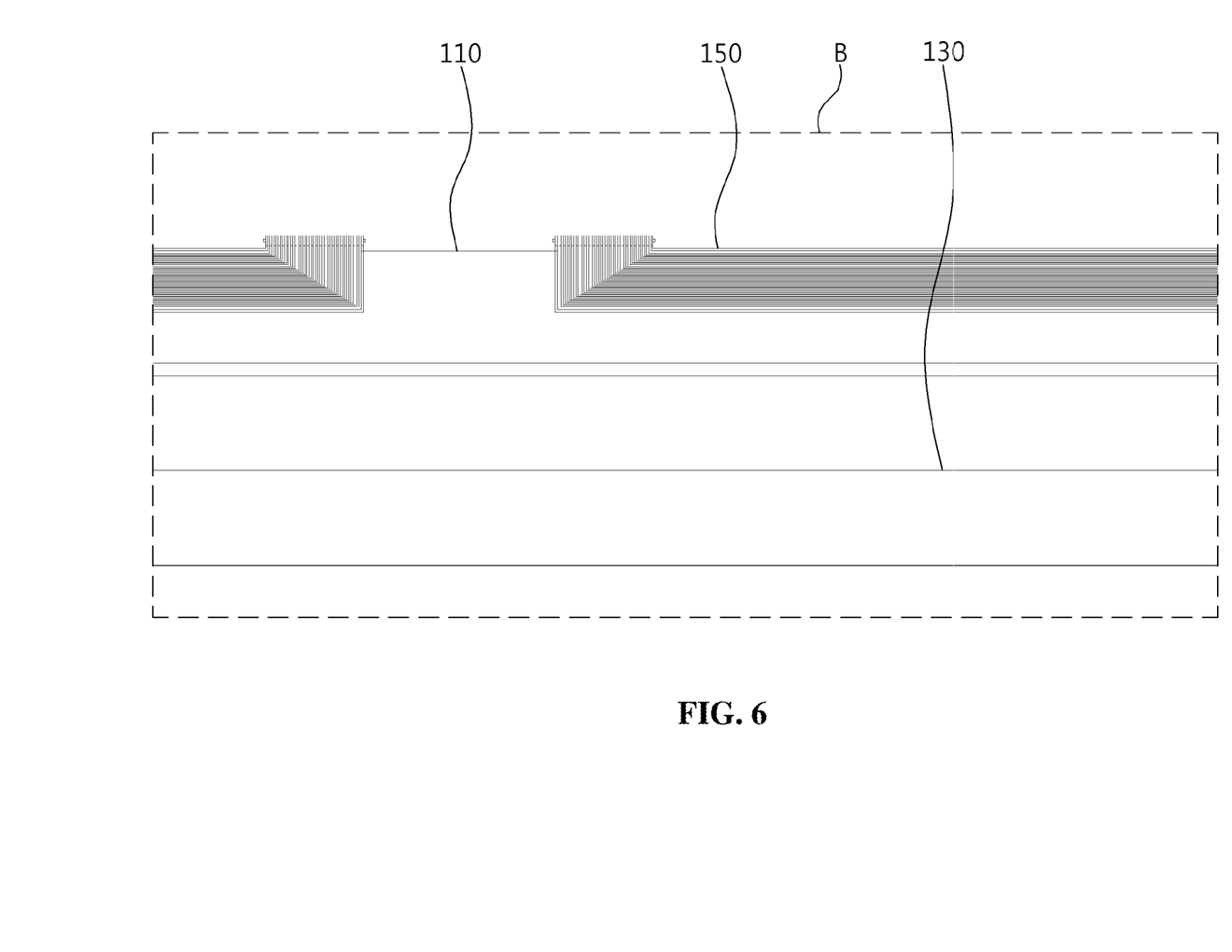

FIG. 1 is a diagram illustrating an example of a general touch screen panel. Referring to the figure, a touch screen panel 10 has a structure in which two touch sensors 16 and a toughened glass 18 covering the touch sensor 16 are stacked in order using transparent adhesive layers 14 on a display panel 12.

That is, in a common touch screen panel, a GFF method is generally used. The GFF method uses two touch screen sensors, in which an no sensing electrode is formed on a film member, and the toughened glass 18. Each of the two sensors is formed with an X-axis sensor or Y-axis sensor.

A wireless communication antenna for constructing a network among electronic devices may be mounted in an electronic device having such a touch screen panel. The antenna place within a housing of the electronic device performs data transmission and reception with an antenna built in another electronic device. Herein, the antenna is configured to perform wireless communication, such as Bluetooth, or the like.

However, regarding recently-released electronic devices, application of a housing formed of a metal material has increased. Herein, in the case of the housing formed of a metal material, there is a problem that it is difficult to realize the performance of the antenna built in the electronic device. In other words, in the case where the housing of the electronic device is formed of a metal material, the current flows on the housing in the opposite direction to the antenna and performs a shielding function that cancels an antenna signal, blocking formation of a radiation field and realization of the performance of the antenna.

DISCLOSURE

Technical Problem

The present invention has been made keeping in mind the above problems occurring in the related art, and the present invention is intended to propose a touch screen sensor and a touch screen panel having the same, wherein an antenna electrode is formed in a dummy region between touch sensing electrodes, thereby preventing visibility degradation of the touch screen panel and performing touch sensing and an antenna function.

Technical Solution

In order to achieve the above objective, according to an embodiment of the present invention, there is provided a touch screen sensor including: a base member made of a transparent material; an upper circuit pattern composed of multiple first sensing electrodes spaced apart from each other and formed on a first surface of the base member; a lower circuit pattern composed of multiple second sensing electrodes spaced apart from each other and formed on a second surface of the base member; and an antenna electrode formed on the first surface of the base member and formed in a dummy space defined between the multiple first sensing electrodes.

The first surface of the base member may be a surface placed in an outward direction from a touch screen panel.

The upper circuit pattern and the antenna electrode may be selected among a transparent electrode and a mesh metal electrode. The upper circuit pattern may be one selected among an X-axis touch sensing electrode and a Y-axis touch sensing electrode, and the lower circuit pattern may be the other one among the X-axis touch sensing electrode and the Y-axis touch sensing electrode.

According to the embodiment of the present invention, the touch screen sensor may further include: an upper connection pattern composed of multiple first trace electrodes connected to the multiple first sensing electrodes, respectively, the upper connection pattern being formed on the first surface of the base member; and an upper connection pattern composed of multiple second trace electrodes connected to the multiple second sensing electrodes, respectively, the upper connection pattern being formed on the second surface of the base member.

The antenna electrode may be formed in at least one dummy space of the multiple dummy spaces defined between the multiple first sensing electrodes.

According to the embodiment of the present invention, the touch screen sensor may further include a dummy pattern formed on the first surface of the base member and formed in the multiple dummy spaces defined between the multiple first sensing electrodes. Herein, the dummy pattern may be one selected among a transparent electrode and a mesh metal electrode.

The antenna electrode and the dummy pattern may be formed in at least one of the multiple dummy spaces.

In order to achieve the above objective, according to an embodiment of the present invention, there is provided a touch screen panel including: a display panel outputting a screen; a coverlay member placed on a surface of the display panel; and a touch screen sensor interposed between the display panel and the coverlay member, wherein the touch screen sensor includes an antenna electrode formed on a surface thereof in a direction of the display panel.

In the touch screen sensor, an upper circuit pattern composed of multiple first sensing electrodes spaced apart each other may be formed on a surface of a base member made of a transparent material, and the antenna electrode may be formed in at least one of multiple dummy spaces which are spaces between the multiple first sensing electrodes.

The touch screen sensor may include a dummy pattern formed in the dummy space. The antenna electrode and a dummy pattern may be formed in at least one among the multiple dummy spaces.

According to the embodiment of the present invention, the touch screen panel may further include: a first transparent adhesive layer interposed between the display panel and the touch screen sensor; and a second transparent adhesive layer interposed between the touch screen sensor and the coverlay member.

Advantageous Effects

In the touch screen sensor according to the present invention, the antenna electrode is formed in the dummy region between the touch sensing electrodes, thereby preventing visibility degradation of the touch screen panel and performing touch sensing and an antenna function.

Also, in the touch screen sensor, the antenna electrode is formed in the dummy region between the touch sensing electrodes, thereby preventing the performance of the antenna from being degraded due to the touch sensing patterns.

Also, in the touch screen sensor, the antenna electrode is formed on the upper surface (specifically, a surface in the direction exposed to the outside when mounted in the electronic device) of the base member, thereby minimizing the mounting space and maximizing the performance of the antenna.

Also, in the touch screen sensor, the antenna electrode is formed of a metal in a mesh structure or of a transparent material, thereby preventing visibility degradation of the touch screen caused by formation of the antenna and transmitting and receiving a signal of a particular frequency band, together with touch sensing.

Also, in the touch screen panel, the antenna electrode is placed in the dummy region that is the space between the multiple first sensing electrodes placed in the direction of the coverlay member, thereby preventing visibility degradation of the touch screen panel and performing touch sensing and an antenna function.

MODE FOR INVENTION

Hereinafter, the most preferred embodiment of the present invention will be described with reference to the accompanying drawings in order to describe the present invention in detail so that the technical spirit of the present invention can be easily embodied by those skilled in the art to which the present invention belongs. First, when inserting reference numerals into the elements in the respective drawings, although the same elements are illustrated in the different drawings, they are described to have the same reference numeral as far as possible. In addition, in the description of the present invention, the detailed descriptions of known related constitutions or functions thereof may be omitted if they make the gist of the present invention unclear.

In a touch screen sensor according to an embodiment of the present invention, an antenna is formed in a dummy region that is defined by touch sensing patterns for touch sensing, thereby preventing visibility degradation of a touch screen panel and performing touch sensing and an antenna function. Herein, in the touch screen sensor, the antenna is formed on a surface that is placed in the outward direction when mounted in the electronic device, thereby preventing the performance of the antenna from being degraded due to the touch sensing patterns.

To this end, referring to FIGS. 2 to 6, a touch screen sensor 100 includes a base member 110, an upper circuit pattern 120, an upper connection pattern 140, a lower circuit pattern 130, a lower connection pattern 150, and an antenna electrode 160.

The base member 110 is made of a transparent material so that user visibility for a touch screen is provided. That is, the base member 110 may be one among a transparent polyimide (PI) film, a polyethylene naphthalate (PEN) film, a polyethylene terephthalate (PET) film, a polycarbonate (PC) film, and a poly styrene sulfonate (PSS) film. Other films of a transparent material, such as engineering plastics, or the like, may be used.

The base member 110 may be toughened glass, or may be a toughened coating film, in which a toughened coating layer increasing hardness is formed on a surface of a film member.

The film member may be a transparent PI film, or may be one among a polyethylene naphthalate (PEN) film, a polyethylene terephthalate (PET) film, a polycarbonate (PC) film, and a poly styrene sulfonate (PSS) film. In addition, it is noted that modifications of the film member may be embodied into any member that fulfills toughened coating with a film of a synthetic resin material.

For example, the toughened coating layer may be formed by being coated with a resin containing silicon (Si) or ceramic, or may be a coating layer through vacuum deposition. In addition, it is noted that modifications of the toughened coating layer may be embodied into any coating layer that increases hardness of a surface of a film member and increases durability against scratches and cracks.

Preferably, having a thickness of 0.3 mm or less, the toughened coating layer is flexible, and is applied to a flexible touch screen panel.

The base member 110 may be a touch screen panel cover member that covers a screen of a display panel 200 (see FIG. 8) of a touch screen panel for protection. Herein, preferably, the touch screen panel cover member is the toughened glass or toughened coating film described above.

The base member 110 is the touch screen panel cover member in which a touch sensing circuit pattern (specifically, the upper circuit pattern 120 and the lower circuit pattern 130) is directly formed on a surface of the touch screen panel cover member in an integrated manner, whereby the touch screen panel is reduced in thickness and the touch screen panel is lightened in weight.

Here, an upper surface of the touch screen panel cover member is a first surface in the outward direction from the touch screen panel, and a lower surface of the touch screen panel cover member is a second surface in the direction of the display panel 200. That is, the upper surface (specifically, the upper surface of the base member 110) of the touch screen panel cover member is exposed in the outward direction from the touch screen panel.

The upper circuit pattern 120 is a touch sensing circuit pattern formed on the upper surface of the base member 110. Herein, the upper circuit pattern 120 is provided on the upper surface of the base member 110 and is composed of multiple first sensing electrodes spaced apart from each other in the horizontal direction. The first sensing electrodes are transparent electrodes for increasing visibility. To this end, the first sensing electrode may be a metal electrode (namely, a mesh metal electrode) in a mesh structure having a fine line width, or may be made of indium tin oxide (ITO), and the like, which is a transparent material.

The lower circuit pattern 130 is a touch sensing circuit pattern formed on the lower surface of the base member 110. Herein, the lower circuit pattern 130 is provided on the lower surface of the base member 110 and is composed of multiple second sensing electrodes spaced apart from each other in the vertical direction. The second sensing electrode are transparent electrodes for increasing visibility. To this end, the second sensing electrode may be made of a metal (namely, a mesh metal electrode) in a mesh structure having a fine line width, or may be made of indium tin oxide (ITO), and the like, which is a transparent material.

The upper circuit pattern 120 forms X-axis touch sensing electrodes that are placed to be spaced apart from each other in the horizontal direction. The lower circuit pattern 130 forms Y-axis touch sensing electrodes that are placed to be spaced apart from each other in the vertical direction. Alternatively, the upper circuit pattern 120 may form the Y-axis touch sensing electrodes, and the lower circuit pattern 130 may form the X-axis touch sensing electrodes.

The upper connection pattern 140 is formed on the upper surface of the base member 110 and is placed on a periphery of a region in which the upper circuit pattern 120 is formed. The upper connection pattern 140 connects the upper circuit pattern 120 with an external circuit. To this end, the upper connection pattern 140 may be composed of multiple first trace electrodes connected to the first sensing electrodes one to one.

The lower connection pattern 150 is formed on the lower surface of the base member 110 and is placed on a periphery of a region in which the lower circuit pattern 130 is formed. The lower connection pattern 150 connects the lower circuit pattern 130 with an external circuit. To this end, the lower connection pattern 150 is composed of multiple second trace electrodes connected to the second sensing electrodes one to one.

In the meantime, the upper connection pattern 140 and the lower connection pattern 150 are placed not to cross each other, through a via hole so that a short is prevented.

The antenna electrode 160 is formed on the upper surface of the base member 110. That is, the antenna electrode 160 is formed on the upper surface of the base member 110, which is the first surface in the outward direction when mounted in the electronic device.

The antenna electrode 160 is formed in a dummy region 170 that is a space between the first sensing electrodes. That is, as the first sensing electrodes constituting the the upper circuit pattern 120 are formed to be spaced apart from each other, the dummy region 170 is defined between a first sensing electrode and another first sensing electrode.

The antenna electrode 160 is formed as an monopole-type antenna that is in a rectangular shape formed in the dummy region 170. Herein, the antenna electrode 160 is formed in at least one dummy region 170 of the multiple dummy regions 170 defined by the first sensing electrodes. Multiple antenna electrodes 160 may be provided according to a communication method used in an electronic device. The multiple antenna electrodes 160 may be formed to have different lengths (or areas) according to resonant frequency bands.

The antenna electrode 160 is an transparent electrode for increasing visibility. To this end, the antenna electrode 160 may be made of a metal (namely, a mesh metal electrode) in a mesh structure having a fine line width, or may be made of indium tin oxide (ITO), and the like, which is a transparent material.

As described above, in the touch screen sensor 100, the antenna electrode 160 is formed on the upper surface (specifically, a surface in the direction exposed to the outside when mounted in the electronic device) of the base member 110, thereby minimizing the mounting space and maximizing the performance of the antenna.

Also, in the touch screen sensor 100, the antenna electrode 160 is formed of a metal in a mesh structure or of a transparent material, thereby preventing visibility gradation of the touch screen caused by formation of the antenna and transmitting and receiving a signal of a particular frequency band, together with touch sensing.

Figure 7:
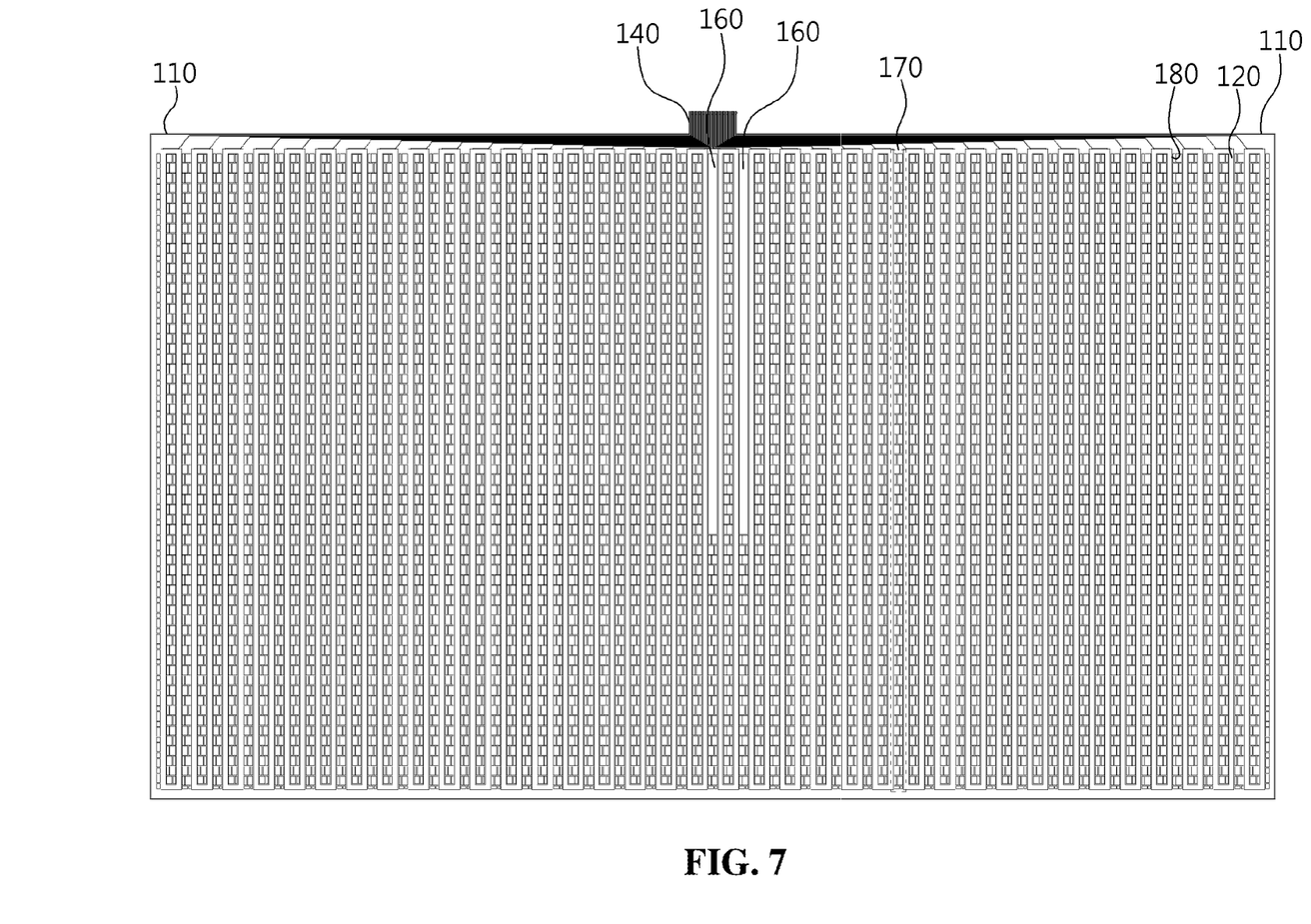
FIG. 7 is a diagram illustrating a modification of a touch screen sensor according to an embodiment of the present invention.

Referring to FIG. 7, the touch screen sensor 100 may further include a dummy pattern 180. That is, in the touch screen sensor 100, a Moiré phenomenon, or the like may occur due to the upper circuit pattern 120 (specifically, the multiple first sensing electrodes). When the moire phenomenon occurs in the touch screen, visibility is degraded. Because of this, the touch screen sensor 100 further includes the dummy pattern 180 formed on the upper surface of the base member 110.

The dummy pattern 180 is formed on the upper surface of the base member 110. The dummy pattern 180 is formed in the dummy region 170 defined between the first sensing electrodes. Herein, the dummy pattern 180 may be made of a metal in a mesh structure having a fine line width, or may be made of indium tin oxide (ITO), and the like, which is a transparent material. Herein, the dummy pattern 180 is composed of an electrode that is not electically connected to the upper circuit pattern 120, the upper connection pattern 140, and the like.

In the case where the dummy pattern 180 is formed in the dummy region 170 in which the antenna electrode 160 is formed, the dummy pattern 180 may be formed only in a region in which the antenna electrode 160 is not formed. Accordingly, the touch screen sensor 100 may prevent visibility degradation caused by the upper circuit pattern 120 and the antenna electrode 160.

Figure 8:
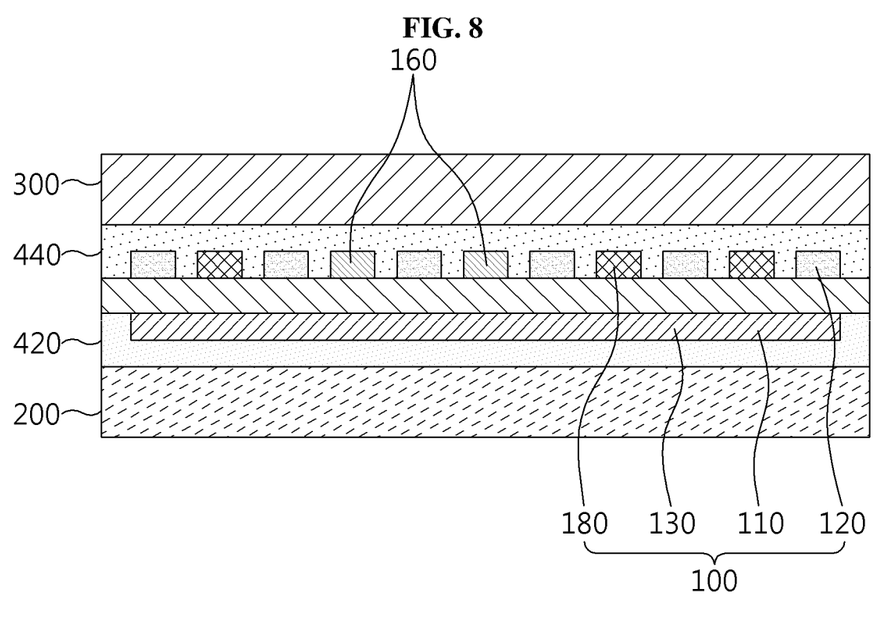
FIG. 8 is a diagram illustrating a touch screen panel according to an embodiment of the present invention.

Referring to FIG. 8, a touch screen panel according to an embodiment of the present invention includes a display panel 200, a coverlay member 300 placed on a surface of the display panel 200, and a touch screen sensor 100 interposed between the display panel 200 and the coverlay member 300, the touch screen sensor sensing a touch on the coverlay member 300.

The coverlay member 300 is formed of a transparent material. That is, the coverlay member 300 is made of a transparent material so that user visibility for a touch screen is provided. Herein, the coverlay member 300 may be toughened glass, or may be a toughened coating film, in which a toughened coating layer increasing hardness is formed on a surface of a film member, for example.

In the meantime, a first transparent adhesive layer 420 is interposed between the display panel 200 and the touch screen sensor 100 to attach the upper surface of the display panel 200 to the lower surface of the touch screen sensor 100. A second transparent adhesive layer 440 is interposed between the touch screen sensor 100 and the coverlay member 300 to attach the upper surface of the touch screen sensor 100 to the lower surface of the coverlay member 300. Herein, the first transparent adhesive layer 420 and the second transparent adhesive layer 440 may be an optically clear adhesive (OCA) film, for example.

On a first surface of the touch screen sensor 100 in the direction of the coverlay member 300, the upper circuit pattern 120 composed of the multiple first sensing electrodes and the antenna electrode 160 are placed. On a second surface of the touch screen sensor 100 in the direction of the display panel 200, the lower circuit pattern 130 composed of the multiple second sensing electrodes is placed.

Herein, the antenna electrode 160 is placed in the dummy region 170, which is a space between the multiple first sensing electrodes placed in the direction of the coverlay member 300, so that the touch screen panel performs touch sensing and an antenna function while preventing visibility degradation of the touch screen panel.

Although the preferred embodiments of the present invention have been disclosed for illustrative purposes, those skilled in the art will appreciate that various modifications and changes are possible, without departing from the scope and spirit of the present invention as disclosed in the accompanying claims.

DESCRIPTION OF THE REFERENCE NUMERALS IN THE DRAWINGS

100: touch screen sensor
110: base member
120: upper circuit pattern
130: lower circuit pattern
140: upper connection pattern
150: lower connection pattern
160: antenna electrode
170: dummy region
180: dummy pattern
200: display panel
300: coverlay member
420: first transparent adhesive layer
440: second transparent adhesive layer

The invention claimed is:

1. A touch screen sensor comprising:
a base member made of a transparent material;
an upper circuit pattern composed of multiple first sensing electrodes spaced apart from each other and formed on a first surface of the base member;
a lower circuit pattern composed of multiple second sensing electrodes spaced apart from each other and formed on a second surface of the base member;
an antenna electrode formed on the first surface of the base member and formed in at least one dummy space of multiple dummy spaces defined between the multiple first sensing electrodes;
a dummy pattern formed in the dummy space of the multiple dummy spaces where the antenna electrode is not formed, and formed in a region where the antenna electrode is not formed in the dummy space in which the antenna electrode is formed;
wherein the dummy pattern is a mesh metal electrode; and
wherein the upper circuit pattern and the antenna electrode are a mesh metal electrode.

2. The touch screen sensor of claim 1, wherein the first surface of the base member is a surface placed in an outward direction from a touch screen panel.

3. The touch screen sensor of claim 1, wherein the upper circuit pattern is one selected among an X-axis touch sensing electrode and a Y-axis touch sensing electrode, and the lower circuit pattern is the other one among the X-axis touch sensing electrode and the Y-axis touch sensing electrode.

4. The touch screen sensor of claim 1, further comprising:
an upper connection pattern composed of multiple first trace electrodes connected to the multiple first sensing electrodes, respectively, the upper connection pattern being formed on the first surface of the base member; and
an upper connection pattern composed of multiple second trace electrodes connected to the multiple second sensing electrodes, respectively, the upper connection pattern being formed on the second surface of the base member.

* * * * *